United States Patent [19]
Iritani et al.

[11] Patent Number: 5,301,515
[45] Date of Patent: Apr. 12, 1994

[54] AIR CONDITIONING APPARATUS FOR AUTOMOBILE

[75] Inventors: Kunio Iritani, Anjo; Akira Isaji, Nishio; Nobunao Suzuki, Toyohashi, all of Japan

[73] Assignee: Nippondenso Co., Ltd., Kariya, Japan

[21] Appl. No.: 12,156

[22] Filed: Jan. 29, 1993

[30] Foreign Application Priority Data

Feb. 5, 1991 [JP] Japan ................................. 3-14033

[51] Int. Cl.⁵ .............................................. B60H 1/00
[52] U.S. Cl. ......................................... 62/126; 62/160; 62/180; 62/244; 454/121
[58] Field of Search ............... 62/160, 180, 186, 125, 62/126, 127, 128, 129, 130, 131, 150, 173, 244, 272, 282, 324.5, 410, 411, 412; 236/49.3, 94; 165/16, 42, 43, 11.1; 454/75, 93, 121

[56] References Cited

U.S. PATENT DOCUMENTS

| | | | |
|---|---|---|---|
| 4,391,320 | 7/1983 | Inoue et al. | 62/180 X |
| 4,519,443 | 5/1985 | Sutoh et al. | 454/121 X |
| 4,996,849 | 3/1991 | Burst et al. | 62/186 X |

FOREIGN PATENT DOCUMENTS 1-239353  9/1989  Japan.

Primary Examiner—Harry B. Tanner
Attorney, Agent, or Firm—Cushman, Darby & Cushman

[57] ABSTRACT

An air conditioning apparatus suitable for an electric car without a hot water source, while preventing the windshield from fogging up when switching from a cooling or dehumidifying operation to a heating operation. Upon the commencement of a heating operation following the end of a preceding cooling or dehumidifying operation lasting for a period longer than a predetermined value, a switching damper 104 is forced to move to the outside air inlet position 104A, when it is determined that a predetermined first time has not elapsed from the end of the last cooling or dehumidifying operation, and a predetermined second time has not elapsed from the commencement of the first heating operation following the end of the last cooling or dehumidifying operation.

17 Claims, 12 Drawing Sheets

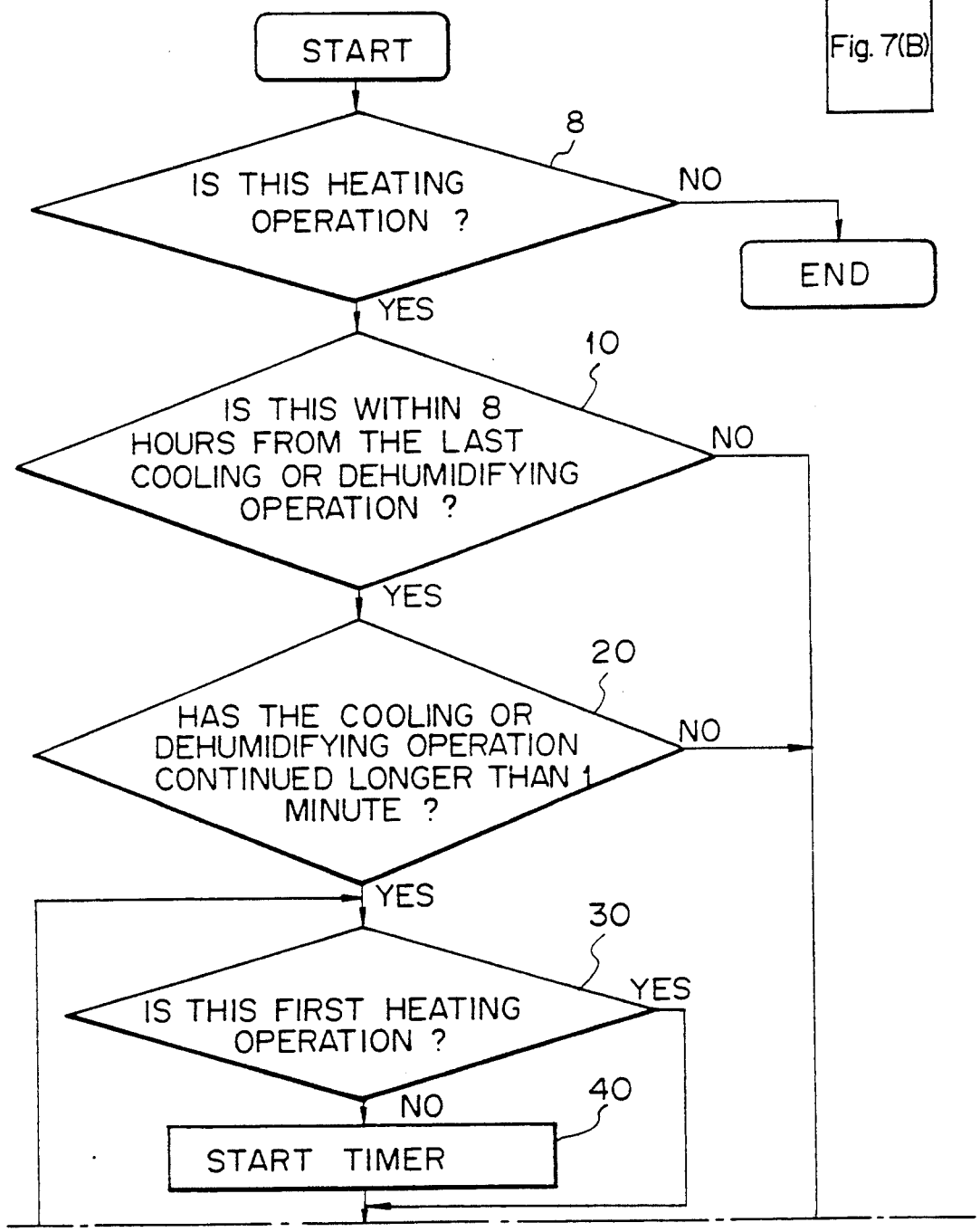

AIR CONDITIONING APPARATUS FOR AUTOMOBILE

BACKGROUND OF THE INVENTION

1. Field of the Invention

The present invention relates to an air conditioning apparatus for an automobile, and in particular, to an air conditioning apparatus suitable for an automobile with no hot water source, such as an electric car.

2. Description of Related Art

In a conventional air conditioning apparatus for an automobile provided with an internal combustion engine, a provision is made for a cooling circuit of a refrigerant from a compressor driven by the engine and a heating circuit of hot water from an engine water jacket, which is independent from the cooling circuit. Namely, in a conventional type air conditioning apparatus for an automobile provided with an internal combustion engine, the cooler as an evaporator located in the refrigerating circuit for cooing the air and the heater located in the hot water circuit for heating the air are arranged separately in an air duct in which air is discharged to a cabin of the vehicle flows, so that the air flow is in contact with the air cooler and the air heater. Namely, the air is, at first, cooled by contacting the air cooler due to the heat exchange of the air with the refrigerant in the cooler, and is heated to a desired temperature by contacting the heater due to the heat exchange of the air with the hot water from the engine cooling system. Furthermore, the hot water heater is arranged in the air duct, so that a by-pass passageway is created that allows an amount of the air to by-pass the hot water heater, and an air mix damper is provided for controlling a ratio of the amount of air directed to the hot water heater and the amount of air directed to the by-pass passageway. The cooled air from the cooler after by-passing the hot water heater is combined with the air after contacting the hot water heater, so that a desired temperature of combined air is obtained in accordance with the degree of the opening of the air mix damper.

Such a type of air conditioning apparatus provided with a refrigerant cooler and a hot water heater cannot, however, be used for an electric car, due to the fact that the electric car does not have any heating source such as hot water. Thus, the electric car usually employs a single refrigerant line for a cooling operation and for a heating operation. Namely, in the electric car, the refrigerating cycle is constructed so as to obtain a refrigerating cycle for cooling and also for obtaining a "heat pump" for a heating operation. Namely, the refrigerating cycle is, as is well known, constructed by a compressor, an inside heat exchanger contacting the air flow in the duct, an outside heat exchanger contacting the outside air flow, and a pressure reduction device. During a cooling operation, the high pressure refrigerant from the compressor is, first, introduced into the outside heat exchanger where the refrigerant is condensed by emitting heat to the atmosphere, and the liquidized refrigerant is, after being subjected to pressure reduction at the pressure reduction device, introduced into the inner heat exchanger, where the refrigerant is evaporated thereby removing heat from the air flow in the duct and reducing the temperature of the air discharged to the cabin. During a heating operation, the high pressure refrigerant from the compressor is, first, introduced into the inside heat exchanger, where the refrigerant is condensed by emitting heat to the air flow in the duct and heating the air discharged to the cabin, and the liquidized refrigerant is, after being subjected to pressure reduction at the pressure reduction device, introduced into the outside heat exchanger, where the refrigerant is evaporated for removing heat from the outside air. It should be noted that temperature control of the air discharged from the duct into the cabin is effected by controlling the flow amount of refrigerant by controlling the rotational speed of the compressor.

Such an air condition system using the refrigerating cycle for both cooling and heating operations suffers from an intrinsic drawback caused by the fact that the same heat exchanger is switched between the cooling and the heating operations. Namely, during a switching from a cooling operation to a heating operation, the inner heat exchanger, which has previously worked as an evaporator (cooler), changes its function to a condenser (heater). Such a switching of the function of the inner heat exchanger from a cooler (evaporator) to a heater (condenser) causes the drops of water attached thereon during the previous cooling operation to evaporate, and the evaporated water together with the hot air heated by the heat exchanger is introduced into the cabin, so that the humidity in the cabin increases, causing condensation to form the windows. Furthermore, a relatively small cabin volume causes such condensation to occur very quickly after the said switching, which during movement of the vehicle, may reduce the field of vision of the driver. From a practical point of view, such a switching from a cooling operation to a heating operation is not usually required. However, during a heating operation, in addition to the inner heat exchanger working as a heater, an additional heat exchanger working as an evaporator for dehumidifying the air flow is often brought into operation. Thus, a switching from a usual heating operation to a dehumidifying operation, which frequently occurs, may also cause condensation to form on the windows.

In order to obviate the above-mentioned problem, the Japanese Un-Examined Patent Publication No. 1-239353 discloses a humidity sensor provided in the duct at a position adjacent to the inner heat exchanger. The detection of a humidity larger than a predetermined value causes the compressor to temporarily stop during a switching from a cooling or dehumidifying operation to a heating operation until the drops of water generated during the preceding operation are fully drained, however, this solution requires a certain amount of time to remove the moisture before the compressor is re-started after switching from the cooling operation to the heating operation. Furthermore, it may occur that the water drops make contact with the humidity sensor, thereby causing it to operate erroneously. In addition, the provision of a humidity sensor is not practical because of the increase in cost thereof.

SUMMARY OF THE INVENTION

An Object of the present invention is to provide an air conditioning apparatus for an automobile capable of preventing condensation from forming on the windows when switching to a heating operation, without requiring the use of expensive humidity sensors or without the air conditioning apparatus stopping for a substantial period of time.

According to the present invention an air conditioning apparatus is provided for an automobile having a cabin, comprising:

a duct having a first end for an intake of air and a second end for the discharge of air to the cabin;

an air inlet switching means for switching between an outside air inlet mode, where the air outside the cabin is introduced into the duct and an inside air inlet mode where the air inside the cabin is introduced into the duct;

fan means for generating a forcible flow of air as introduced into the duct via said inlet;

heat exchanging means for receiving a flow of a heat exchanging medium so as to obtain a heat exchange of the medium with said air flow in the duct;

heat source switching means for switching between a low temperate source mode where the source of a medium having a low temperature is connected to the heat exchanging means, and a hot temperature source mode where the source of a medium having a high temperature is connected to the heat exchanging means, and;

means for forcing said air inlet switching means so as to obtain said outside air inlet mode when switching to the hot temperature source mode after the execution of a cooling operation or a dehumidifying operation under the low temperature source mode.

According to the present invention, a switching to the outside air inlet mode is forced when a heating operation commences after the execution of the preceding cooling or dehumidifying operation. As a result, an abrupt increase in the cabin humidity when switching to an heating operation is prevented.

BRIEF DESCRIPTION OF ATTACHED DRAWINGS

Figure 7B:
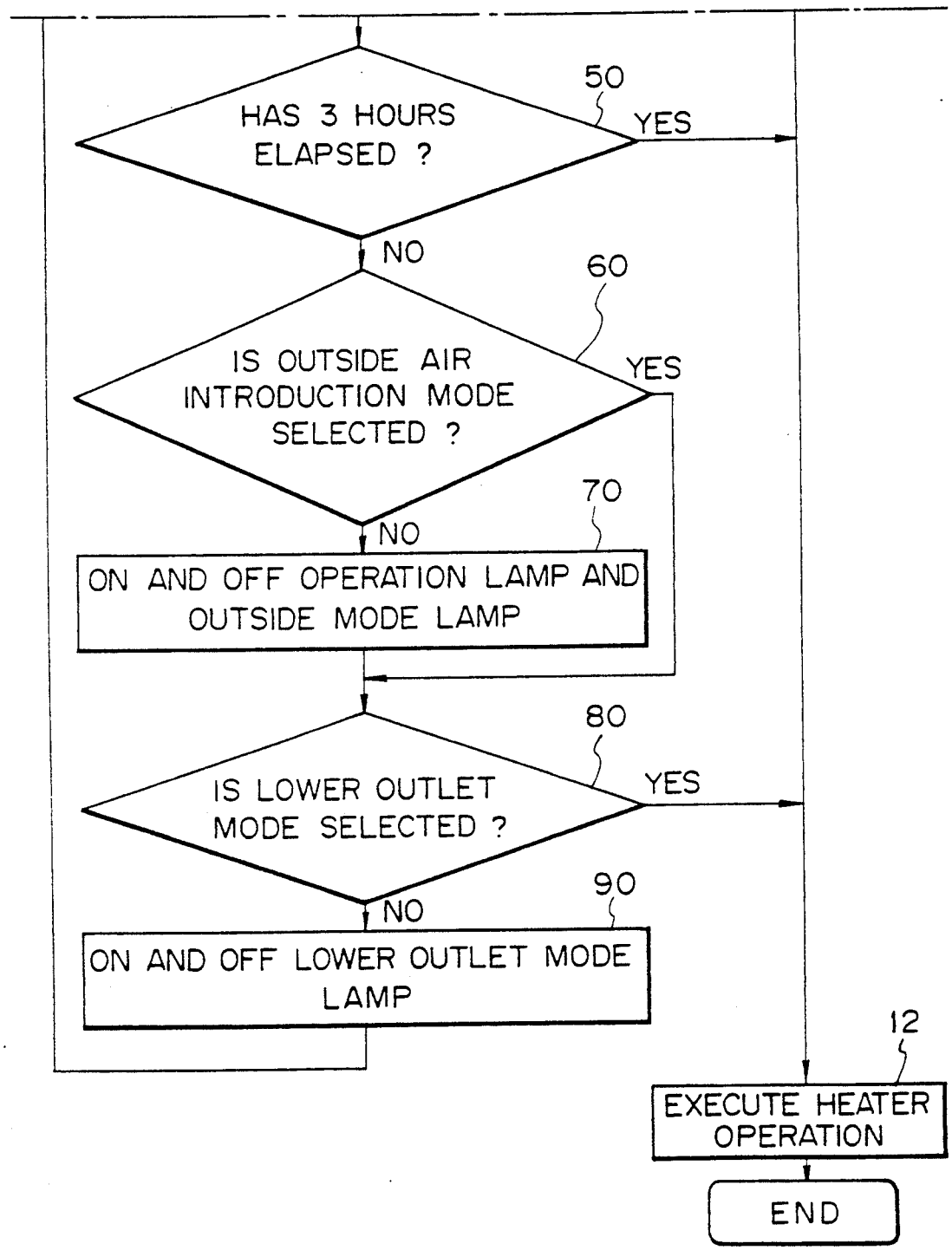

FIGS. 7(A) and 7(B) show a flowchart illustrating the operation of the air conditioning apparatus according to the first embodiment of the present invention.

FIG. 7 is a diagram showing how FIGS. 7(A) and 7(B) are connected.

Figure 3:
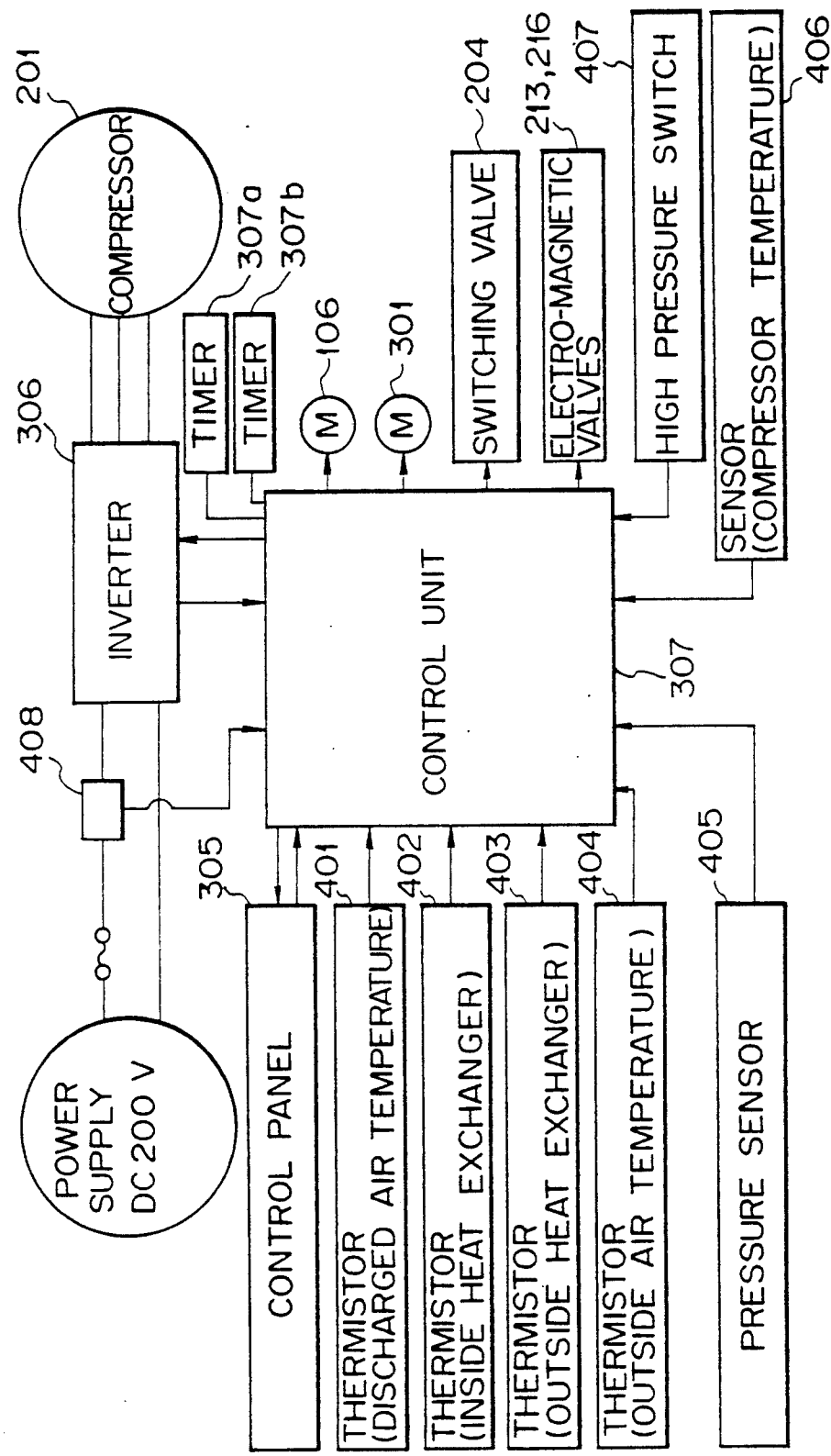
FIG. 3 is a schematic view of a control unit for the air conditioning apparatus according to the present invention.
Figure 8:
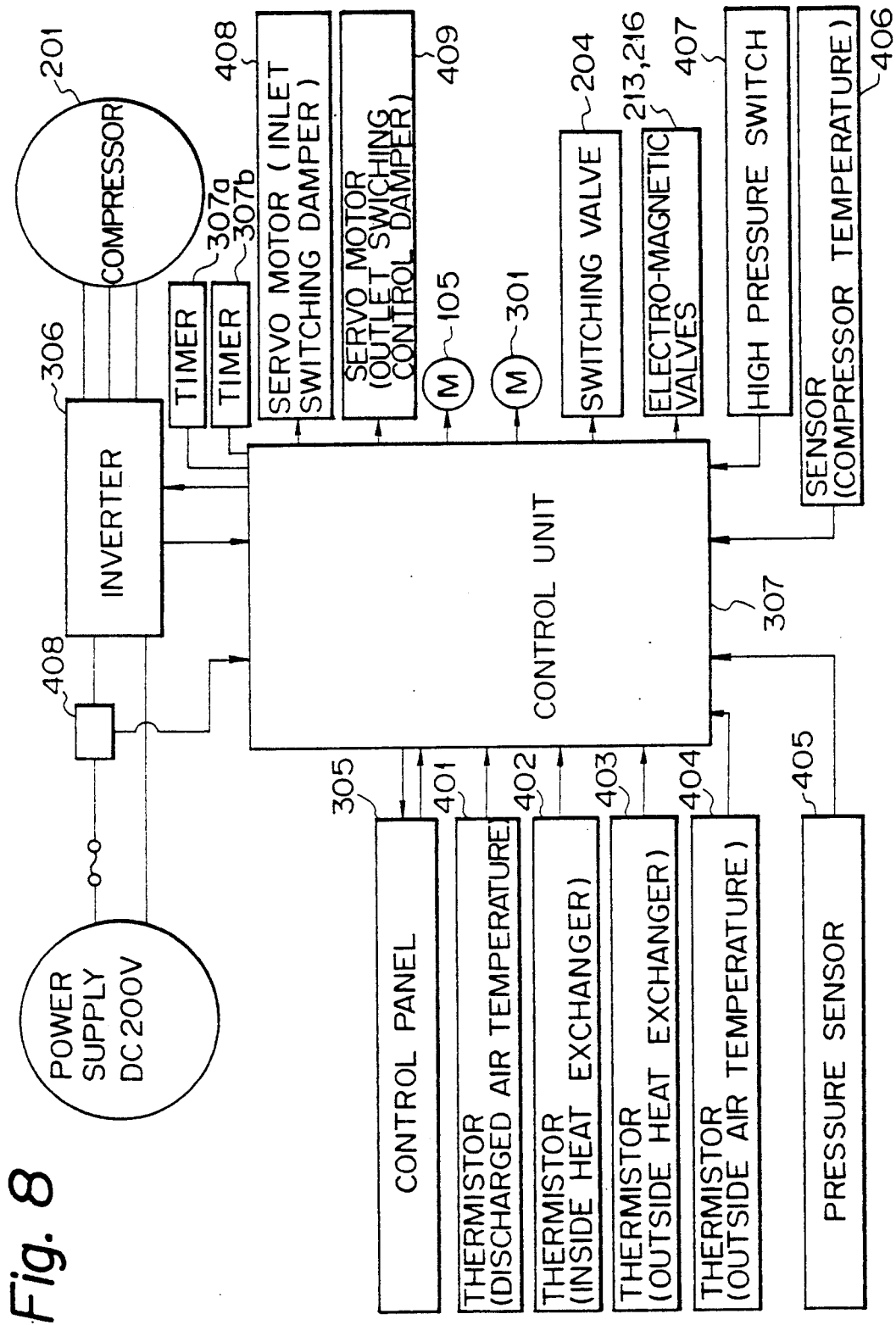

FIG. 8 is similar to FIG. 3, but illustrates a control unit in a second embodiment.

Figure 9:
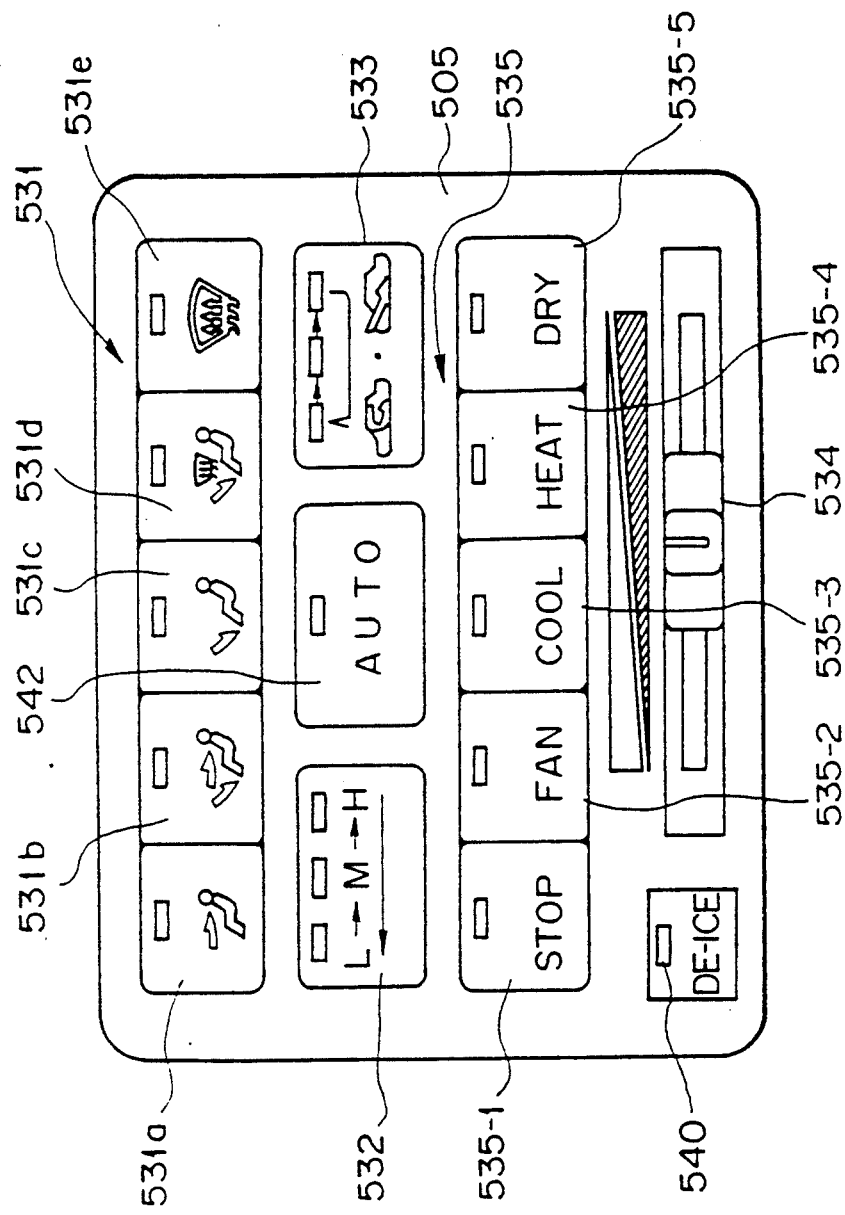

FIG. 9 is a front view of a control panel for the control unit in a second embodiment.

Figure 10:
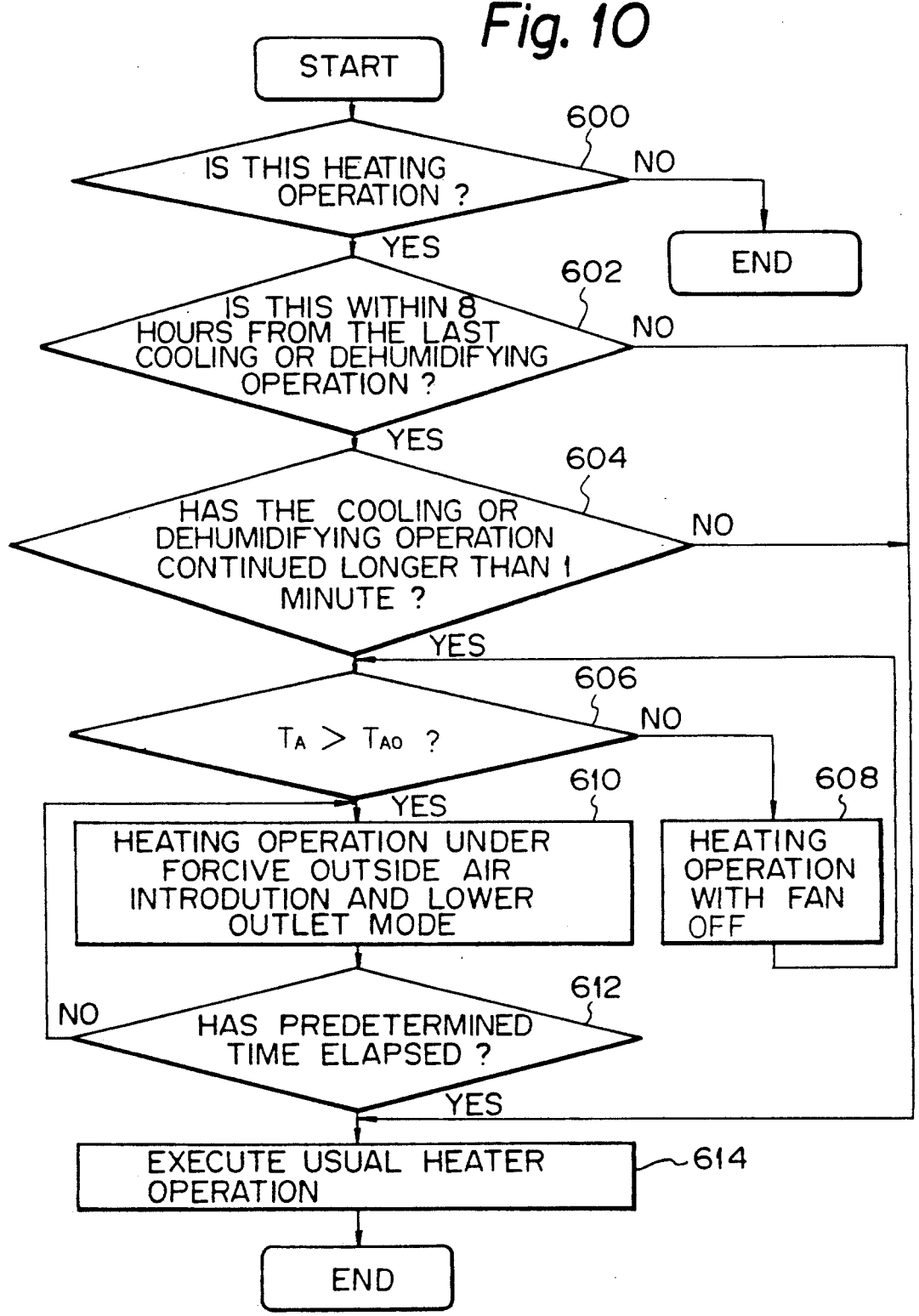

FIG. 10 is a flowchart illustrating the operation of the air conditioning apparatus according to the second embodiment of the present invention.

Figure 11:
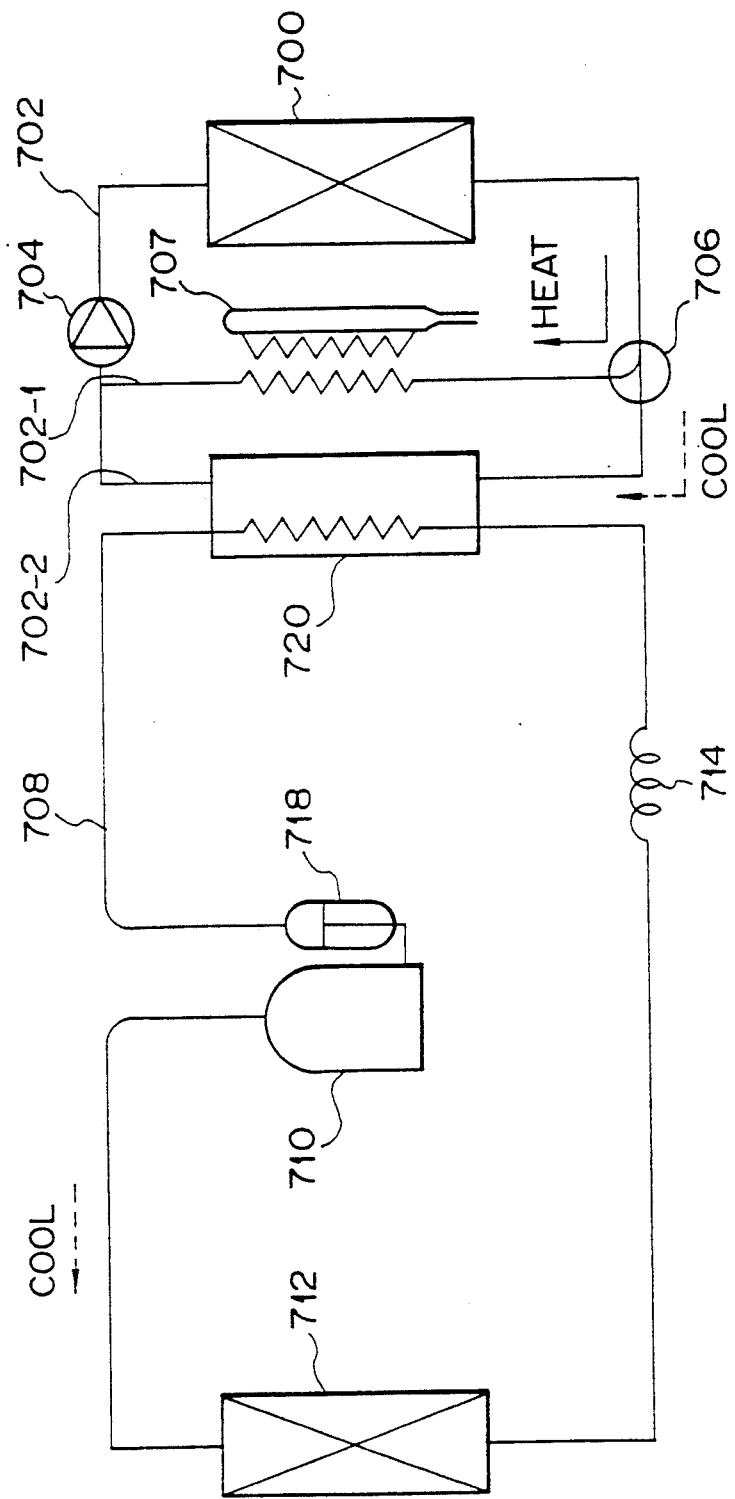

FIG. 11 shows a refrigerating circuit in a third embodiment of the present invention.

DESCRIPTION OF PREFERRED EMBODIMENTS

Figure 1:
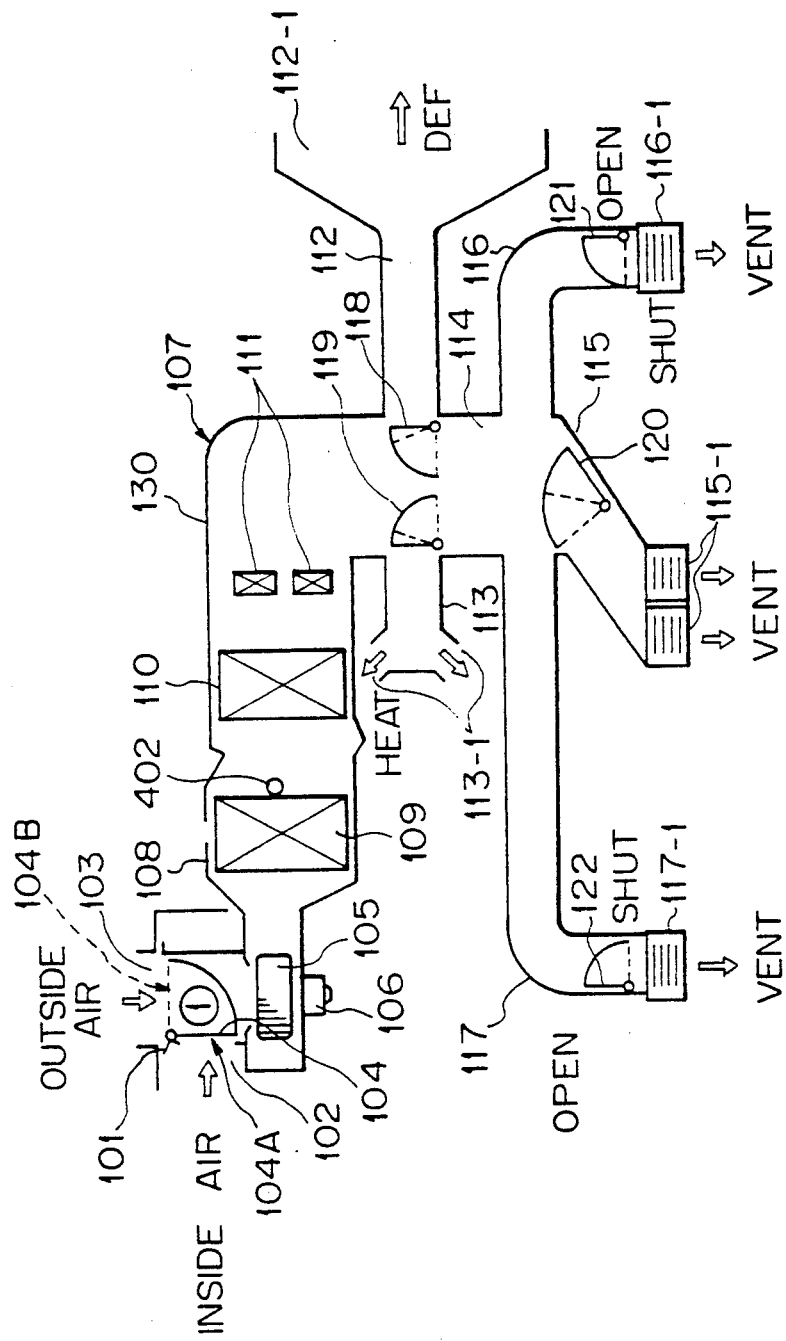
FIG. 1 is a schematic view of an inside unit for an air conditioning apparatus according to the present invention.

In FIG. 1 showing an inner unit of an air conditioning apparatus according to the present invention, a reference numeral 107 denotes an air duct, in which a switching device 101 is arranged for switching between a position where inside air from the cabin is introduced into the duct 107 and a position where outside air from the atmosphere is introduced into the duct 107. The duct 107 has an inside air inlet 102 connected to the cabin via a duct (not shown) and an outside air inlet 103 opened to the atmosphere. The switching device 101 includes a damper 104 moved between a first position 104A as shown by a solid line where the inside air inlet 102 is closed and the outside air inlet 103 is opened, and a second position 104B as shown by a dotted line, where the inside air inlet 102 is opened and the outside air inlet 103 is closed. The damper 104 is connected, via a well known manually operated system, to an inlet switching lever 333 (FIG. 4) for moving the damper 104 between the first and second positions 104A and 104B, and arranged in the duct 107 at a position located below the damper 104 is a fan 105 for generating a forced flow of air in the duct 107, taken from the inside air inlet 102 or outside air inlet 103. The fan 105 is connected to an electric motor 106 for generating a rotational movement transmitted to the fan 105.

As shown in FIG. 1, the duct 107 has a first section 108 located adjacent the switching device 101 and a second section 130 connected to the first section for receiving the air flow therefrom. Arranged in the first section 108 of the duct 107 is a first inner heat exchanger 109, while arranged in the second section 130 of the duct 107 is a second heat exchanger 110. An auxiliary heater 111 made from, for example, an electric heater is arranged in the second section 130 at a location downstream from the second inner heat exchanger 110. The second section 130 has a downstream end, from which ducts 112, 113 and 114 extend. The duct 112 is opened to a defroster outlet 112-1 for discharging an air flow directed to a bottom portion of a window shield (not shown). The duct 113 is opened to lower level outlets 113-1 for discharging air flows directed to a lower part of a passenger. The duct 114 is opened to center upper duct 115 opened to center, upper outlets 113-1 for discharging air flows directed to the upper part of the passenger at the center of the cabin, and right and left upper ducts 116 and 117 opened to right and left upper outlets 116-1 and 117-1 for discharging air flows directed to upper parts of the passengers at locations adjacent to the side windows. Arranged adjacent to the defroster duct 112 is a defroster damper 118 for controlling the flow of air from the defroster outlet 112-1. Arranged adjacent to the lower level duct 113 is an lower outlet damper 119 for controlling the flow of air from the lower level outlets 113-1. Furthermore, a damper 120 is arranged in the upper, center duct 120 for controlling the flow of air from the center, upper outlets 115-1. Finally, dampers 121 and 122 are arranged in the upper, right and left ducts 121 and 122 for controlling the flow of air from the upper, right and left outlets 116-1 and 117-1, respectively.

Figure 2:
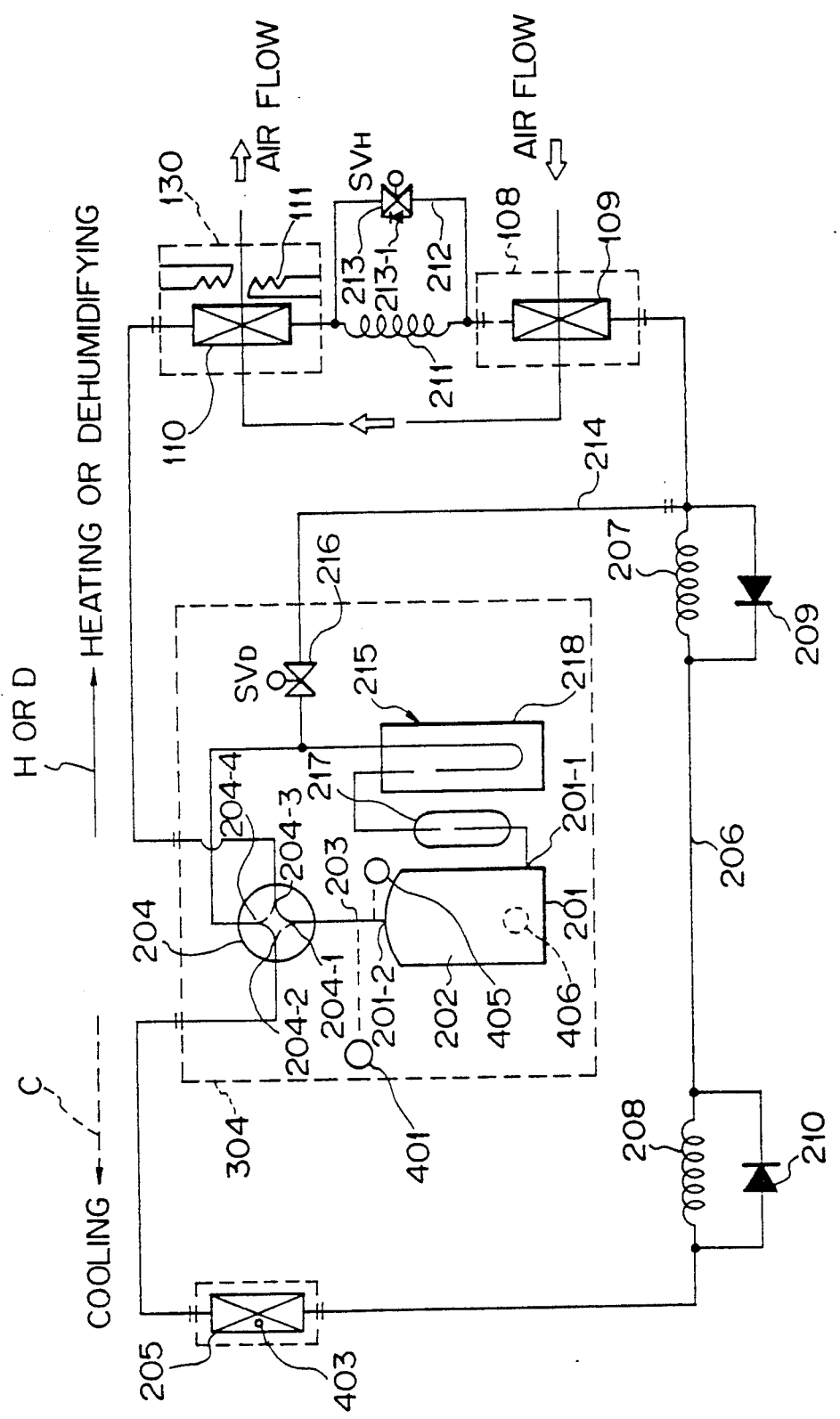
FIG. 2 is a schematic view of a refrigerating circuit for the air conditioning apparatus according to the present invention.

FIG. 2 shows a refrigerant circuit that is basically constructed by, in addition to the first and second inner heat exchangers 109 and 110 in FIG. 1, a compressor 201, an outside heat exchanger 205 located in a suitable place of the vehicle outside the duct 107, pressure reducer means (a first, second and a third pressure reducers 207, 208 and 211), and an accumulator means 215. The compressor 201 has a hermetically sealed case 202 in which a compressor section and an electric motor for generating a rotational movement applied to the compressor section are housed. The compressor 201 has an inlet 201-1 for the introduction of a low temperature gaseous refrigerant and an outlet 201-2 for discharging a high temperature gaseous refrigerant. As will be explained later in reference to FIG. 3, the electric motor of the compressor 201 is connected to a battery via an inverter 306 for controlling the frequency of the AC current applied to the electric motor for obtaining a continuously varied rotational speed of the compressor 201.

In FIG. 2, a reference numeral 204 denotes a four port two position switching valve 204 having a first port 204-1 connected to the outlet 201-2 of the compressor, a second port 204-2 connected to an outside heat exchanger 205 located outside the duct 107 in FIG. 1, a third port 204-3 connected to the second (downstream) heat exchanger 110 in the dust 107 in FIG. 1, and a fourth port 204-4 connected to the accumulator 215. The switching valve 204 is moved between a first position where, as shown by a dotted line, the first and second ports 204-1 and 204-2 are connected and the third and fourth ports 204-3 and 204-4 are connected, and a second position where, as shown by a solid line, the first and third ports 204-1 and 204-3 are connected, and the second and fourth ports 204-2 and 204-4 are connected. In the first position, the high pressure gaseous refrigerant is, first, directed to an outside heat exchanger 205 as shown by a dotted line C. Contrary to this, in a second position, the high pressure gaseous refrigerant is, first, directed to the second inner heat exchanger 110 and then to the first heat exchanger 109. The inner heat exchanger 109 is, via a refrigerant pipe 206, connected to the outside heat exchanger 205, and the first and second pressure reducer 207 and 208 are arranged on the pipe 206 in a series manner. The first pressure reducer 207 made as a capillary tube is for obtaining a pressure reduction function during a cooling operation and is at its one end connected to the first inner heat exchanger 109, and at its second end connected to the second pressure reducer 208. The second pressure reducer 208 is also made as a capillary tube and is for obtaining a pressure reduction operation during a heating operation as will be explained later. A check valve 209 is connected parallel to the first capillary tube 207 for controlling the direction of the flow of the refrigerant in the capillary tube 207. A check valve 210 is connected parallel to the second capillary tube 208 for controlling the direction of the flow of the refrigerant in the capillary tube 208.

Between the first inner heat exchanger 109 and the second inner heat exchanger 110, the third pressure reducer 211 also constructed as a capillary tube is arranged, which is for obtaining a pressure reduction operation during a dehumidifying operation. Connected parallel to the capillary tube 211 is a by-pass passageway 212 on which is arranged an electromagnetic valve 213 with a check valve 213-1. The check valve 213-1 always allows a flow of the refrigerant in a direction from the fist heat exchanger 109 to the second heat exchanger 110. Contrary to this, concerning a flow from the second heat exchanger 110 to the first heat exchanger 109, such a flow is allowed only when the electromagnetic valve 213 is energized, and said flow is blocked when the electromagnetic valve 213 is de-energized on the passageway.

A by-pass passageway 214 is, at its one end, connected to the refrigerating circuit at a position between the first capillary tube 207 and the first inner heat exchanger 109, and at its second end connected to a refrigerating circuit at a position between the fourth port 204-4 of the switching valve 204 and the accumulator 215 and an electromagnetic valve 216 that is normally closed is arranged thereat.

The accumulator 215 is for separating a gaseous component from the refrigerant as introduced, and sending the separated gas into the compressor 201, and is such that 50 to 100% of the total amount of the refrigerant in the refrigerating cycle can be stored in the accumulator. As shown in FIG. 2, the accumulator 215 is constructed by a first container 217 near the compressor 201 and a second container 218, which are connected in series in the direction of the flow of the refrigerant. The first and second containers 217 and 218 can store about 1300 cc of the liquid refrigerant, while the total amount of liquid state refrigerant in the refrigerating cycle is 1500 cc.

Figure 4:
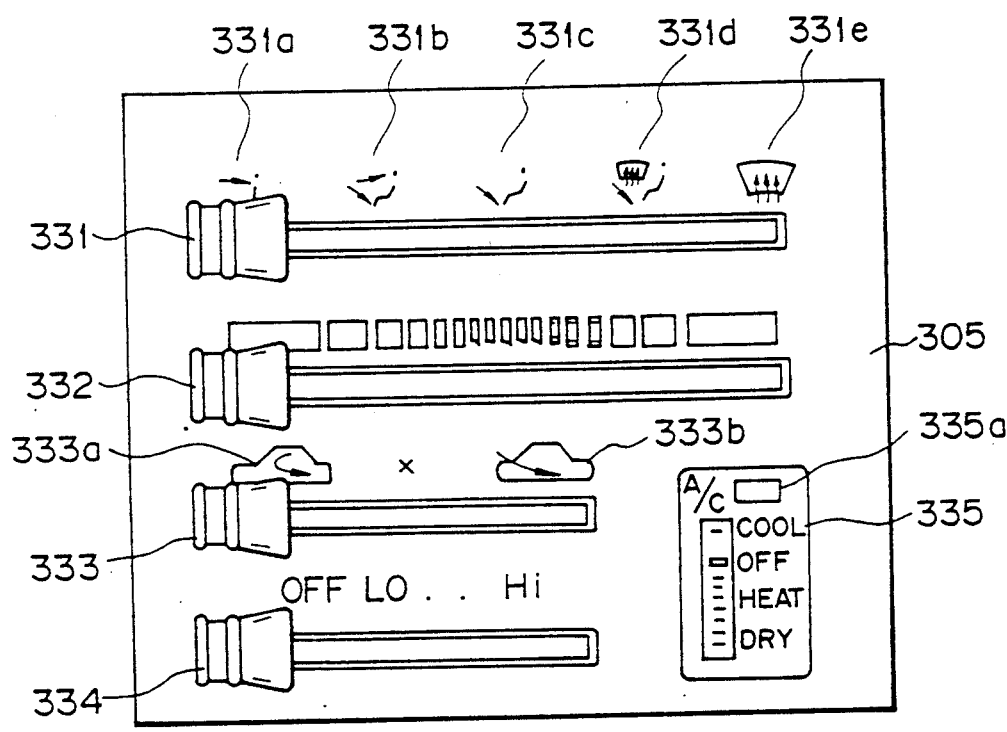
FIG. 4 shows a front view of a control panel for the control unit in FIG. 3.

FIG. 3 shows a control unit 307 for controlling the operation of the air conditioning system according to the present invention. A control box 305 is arranged in a suitable location of a cabin, such as dash panel, in which various control levers as shown in FIG. 4 are arranged, and the control box 305 is connected to the control unit 307, and corresponding signals indicating positions of respective levers are input to the control unit 307. Connected also to the control unit 307 are a temperature sensor (thermistor) 401 for detection of the temperature of the high pressure gaseous refrigerant from the compressor 201, a temperature sensor (thermistor) 402 for detecting the temperature of the heat exchanging surface of the first inner heat exchanger 109, a temperature sensor (thermistor) 403 for detecting the temperature of the refrigerant at the outside heat exchanger 205, a temperature sensor 404 for detecting ambient temperature, a pressure sensor 405 for detecting the pressure of the refrigerant issued from the compressor 201, a temperature sensor 406 for detection of the temperature of the body of the compressor 201, and a switch for detecting high pressure refrigerant from the compressor 201. Furthermore, a detector 408 of an electric current in the inverter 306 is connected to the control unit 307 for obtaining a feedback control of the inverter 306 by means of the control unit 307. The control unit 307 executes desired functions in accordance with programs stored therein and issues a signal to various operating members in the air conditioning apparatus in FIGS. 1 and 2; said members are the electromagnetic valves 213 and 216, the switching valve 204, the electric motor 106 (FIG. 1) for operating the fan 105, and an electric motor for an outside fan 301 (FIG. 5) arranged so as to face the outside heat exchanger 205 for generating a flow of outside air.

In FIG. 3, the control unit 307 is connected to timers 307a and 307b. The first timer 307a detects a lapsed time from the end of the cooling or dehumidifying operation, and the second timer 307b detects a time after the heating operation is commenced following the end of the cooling or dehumidifying operation.

In FIG. 3, the electric current sensor 408 issues a signal indicative of the electric current into the inverter 306 for controlling the rotational speed of the compressor. The electric current signal from the sensor 408 is used to prevent the compressor 201 from overloading.

Namely, a value of the electric current to the inverter 306 larger than a predetermined value reduces the frequency of the AC current to the compressor 201 thereby decreasing the rotational speed of the compressor 201.

Uses of the signals from the various sensors as described above in the control unit 307 will be explained in more detail. A signal from the outlet temperature sensor 401 is used for limiting the winding temperature of the electric motor of the compressor 201 when the compressor is overloaded. Namely, a value of the temperature of the refrigerant as discharged from the outlet 204-1 of the compressor larger than a predetermined value of, for example, 115° C. reduces the frequency of the output AC current from the inverter 306 thereby reducing the rotational speed of the compressor 201 and decreasing the load in the compressor 201. The signal from the pressure sensor 405 is used for reducing the pressure of the refrigerant when same is overloaded. Namely, pressure of the refrigerant issued from the compressor 201 larger than 26 kg/cm$^2$ reduces the frequency of the AC current applied to the electric motor for the compressor 201 thereby decreasing the rotational speed of the compressor 201 and reducing the pressure of the refrigerant.

The signal from the inside heat exchanger temperature sensor 402 is used to prevent the inner heat exchanger 109 from icing during a cooling operation. Namely, a temperature of the heat exchanging surface of the inside heat exchanger 109 lower than a predetermined value, for example 0° C., may reduce the frequency of the AC signal from the inverter 306 to the compressor, so that the rotational speed of the compressor 201 is reduced thereby decreasing the refrigerating capacity of the heat exchanger 109 acting as an evaporator and preventing the inner heat exchanger from accumulating ice.

The signals from the feedback signal from the electric current sensor 408 is used to obtain a feed back control of the electric current in the inverter 306. Namely, a value of the electric current in the inverter 306 higher than a predetermined value reduces the frequency of the AC current from the inverter 306 to the compressor 201 thereby reducing the rotational speed of the compressor 201. Contrary to this, a value of the electric current in the inverter 306 lower than a predetermined value increases the frequency of the AC current from the inverter 306 to the compressor 201 thereby increasing the rotational speed of the compressor 201. As a result of such a feedback control, the electric current in the inverter 306 is controlled to a target value.

The signals from the outside heat exchanger temperature sensor 403 and the outside air temperature sensor 404 are used for defrosting the outside heat exchanger 205 during a heating operation. Namely, a need for a defrosting operation is detected when the outside air temperature is lower than a predetermined value while the temperature difference between the refrigerant and the air at the outside heat exchanger 205 is larger than a predetermined value. A warning lamp (not shown) is then lit to notify the driver that the outside heat exchanger 205 is iced and that a de-icing operation should be started. Furthermore, a temporary switching of the direction of the flow of the refrigerant is effected and a high temperature refrigerant is introduced into the outside heat exchanger 205 for defrosting same.

The signal from the compressor temperature sensor 406 is used to prevent the winding of the electric motor of the compressor 201 from being thermally damaged. Namely, a temperature of the winding of the compressor 201 detected by the sensor 406 larger than a predetermined value, for example, 120° C. causes the compressor 201 to temporarily stop. The compressor 201 is again energized when a reduction in the temperature of the winding of the electric motor of the compressor 201 occurs.

The signal from the high pressure switch 407 is also used to prevent the refrigerating cycle from attaining an abnormally high pressure. Namely, the pressure of the refrigerant as discharged from the outlet 201-2 of the compressor 201 larger than a predetermined value, for example, 29 kg/cm$^2$ causes the inverter 306 to disconnect from the battery thereby temporarily stopping the compressor 201. A reduction in the pressure of the refrigerant detected by the high pressure switch 407 allows the refrigerating cycle to move again thereby starting the refrigerating cycle.

Furthermore, a means is provided for detection of the electric voltage from the electric power source. Namely, a value of the electric voltage lower than a predetermined value of, for example, 170 volts, causes the inverter 306 to temporary stop thereby preventing the compressor from operating incorrectly. A recovery of the electric voltage to a desired value allows the inverter 306 to be energized again thereby starting the refrigerating cycle. Furthermore, a value of the electric voltage higher than a predetermined value of, for example, 240 volts, causes the inverter 306 to temporarily stop thereby preventing the electric parts from receiving an excessive electric voltage. In this case, it is preferable that the control unit 307 be manually operated so as to recover the operation of the inverter 306. Furthermore, a means is provided for preventing an excessive electric current from generating in the inverter 306. For example, an excessive electric current in the inverter of 150% or more of a rated current for a period longer than, for example, 120 seconds causes the inverter to de-energize. In this case, it is also preferable that the control unit 307 be manually operated to recover the operation of the inverter 306. Finally, a sensor (not shown) may be provided for detecting the temperature of the inverter 306 and de-energizing the inverter 306 thereby preventing its parts from being damaged. In this case, it is also preferable that the control unit 307 be manually operated so as to recover the operation of the inverter 306.

FIG. 4 illustrates an arrangement of the control panel 305 in FIG. 3. The control panel 305 includes an outlet switching lever 331, a temperature control lever 332, an inlet switching lever 333, a blower control lever switch 334 and a mode control switch 335. The outlet switching lever 331 is moved between positions (lamps) 331a, 331b, 331c, 331d and 331e for controlling the dampers 118, 119, 120, 121 and 122 so that a desired air outlet mode is obtained. At the position 331a, referred to as an upper outlet mode, the air is discharged to the cabin from the upper outlet 115-1, 116-1 and 117-1. At the position 331b, referred to as a bi-level mode, the air is discharged to the cabin from the upper outlets 115-1, 116-1 and 117-1 and the lower outlets 113-1. At the position 331c, referred to as a vent-defroster mode, the air is discharged to the cabin via the lower outlets 113-1 and the defroster outlet 112-1. At the position 331e, referred to as a defroster mode, the air is discharged into the cabin from the defroster outlet 112-1. The temperature control lever 332 controls the rotational speed of the compressor 201 for controlling the temperature of the air discharged to the cabin. The switching lever 333 moves between positions (lamps) 333b and 333a for controlling the damper 104 between the position 104A and introducing the outside air into the duct 107 via the inlet 103 and the position 104B for introducing the inside air into the duct 107 via the inlet 102. The blower switch 334 controls the rotational speed of the motor 106 for controlling the amount of air introduced into the duct 107. The mode control switch 335 switches between the cooling mode (COOL), heating mode (HEAT) and a dehumidifying (DRY) mode.

Furthermore, on the panel adjacent to the mode control switch 335, an indicator lamp 335a is arranged and is operated during the air conditioning operation. At the positions 331a, 331b, 331c, 331d and 331e, respective lamps are provided for illustrating the discharge mode as selected. Similarly, at the position 333a and 333b, lamps are provided for indicating the selected air introduction mode.

It should be noted that, during normal operating conditions, these lamps are continuously lit. However, as will be fully explained later, when a switching to the outside air introduction position is requested by the control unit 307 upon switching to the heating operation from the cooling or dehumidifying operation, the position of the outlet control lever 331 other than the lower outlet mode (heater mode) position (331c) or the position of the inlet switching lever 333 other than the outside air introduction position (333b) turns the indicator lamp 331c or 333b ON and OFF and reminds the driver to move the corresponding lever 331 or 333 to suitable positions (331c and 333b).

Control of the direction of the flow of the refrigerant during the cooling, heating or dehumidifying operation will be explained with reference to FIG. 2.

When the mode control switch 335 in FIG. 4 is moved to the COOL position, the cooling mode starts, and the switching valve 204 is switched to the dotted position where the first and second ports 204-1 and 204-2 and the third and fourth ports 204-3 and 204-4 are connected, and the electromagnetic valve 213 is de-energized and assumes an open position while the electromagnetic valve 216 is de-energized and assumes a closed position. As a result, a flow of refrigerant, as shown by an arrow C, is obtained, which in order, passes the outlet 201-2 of the compressor 201, the ports 204-1 and 204-2 of the switching valve 204, the outside heat exchanger 205, the check valve 210, the pressure reducing device 207, the upstream inner heat exchanger 109, the check valve 213-1, the downstream heat exchanger 110, the ports 204-3 and 204-4 of the switching valve 204, an accumulator 215 and the inlet 201-1 of the compressor 201. Namely, the high temperature gaseous refrigerant from the compressor 201 is introduced into the outside heat exchanger 205, where the refrigerant is condensed while the heat is emitted into the atmosphere. The liquidized refrigerant from the outside heat exchanger 205 is introduced into the pressure reducing device 207 as a capillary tube, where the refrigerant is transformed to a mist. The low pressure mist state refrigerant from the pressure reducing device 207 is, first, introduced into the upstream inner heat exchanger 109, where the refrigerant absorbs heat from the air in the duct 107, and contacts the heat exchanger 109 thereby causing the refrigerant to evaporate, while the air in the cut is cooled and discharged into the cabin. The gaseous and liquid combined state refrigerant is then passed through the check valve 213-1 and the downstream heat exchanger 110 and introduced into the accumulator 215, whereat the gaseous state refrigerant is separated and directed to the inlet 201-1 of the compressor 201.

When the mode control switch 335 in FIG. 4 is moved to the HEAT position, the heating mode is started where the switching valve 204 is switched to the solid position where the first and third ports 204-1 and 204-3 are connected, and the second and fourth ports 204-2 and 204-4 are connected, and the electromagnetic valve 213 is energized and assumes an open position while the electromagnetic valve 216 is de-energized and assumes a closed position. As a result, the flow of refrigerant, as shown by an arrow H, is obtained, which, in order, passes the outlet 201-2 of the compressor 201, the ports 204-1 and 204-3 of the switching valve 204, the downstream inner heat exchanger 110, the electromagnetic valve 213, the upstream heat exchanger 109, the check valve 209, the pressure reducing device 208, the outside heat exchanger 205, the ports 204-2 and 204-4, the accumulator 215 and the inlet 201-1 of the compressor 201. Namely, the high temperature gaseous state refrigerant from the compressor 201 is introduced into the inner downstream heat exchanger 110, where the refrigerant is condensed while heat is emitted to the air in the duct 107, contacting the heat exchanger 110 for heating the air discharged to the cabin. The liquidized refrigerant is, via the electromagnetic valve 213 and the upstream inner heat exchanger 103, directed to the pressure reducing device 208 as a capillary tube, where the refrigerant is transformed to a mist. The low pressure mist state refrigerant from the pressure reducing device 208 is introduced into the outside heat exchanger 205, where the refrigerant absorbs heat from the atmosphere, and contacts the heat exchanger 205 thereby causing the refrigerant to evaporate. The refrigerant is then introduced into the accumulator 215, whereat the gaseous state refrigerant is separated and directed to the inlet 201-1 of the compressor 201. It should be noted that the auxiliary electric heater 111 may be additionally operated when the outside temperature is very low.

When the mode control switch 335 is FIG. 4 is moved to the DRY position, the dehumidifying mode is started, where a flow of the refrigerant, similar to that (arrow H) in the heating mode, is obtained. Namely, the switching valve 204 is switched to the solid position where the first and third ports 204-1 and 204-3, and the second and fourth ports 204-2 and 204-4 are connected. However, the electromagnetic valve 213 is de-energized and assumes a closed position while the electromagnetic valve 216 is energized and assumes an open position. As a result, the flow of refrigerant is obtained, which, in order, passes the outlet 201-2 of the compressor 201, the ports 204-1 and 204-3 of the switching valve 204, the downstream inner heat exchanger 110, the capillary tube 211 acting as a pressure reducing device, the upstream heat exchanger 109, the electromagnetic valve 216 on the line 214, the accumulator 215 and the inlet 201-1 of the compressor 201. Namely, the high temperature gaseous refrigerant from the compressor 201 is introduced into the inner downstream heat exchanger 201-110, where the refrigerant is condensed while the heat is emitted to the air in the duct 107, and contacts the heat exchanger 110 for heating the air discharged to the cabin. The liquidized refrigerant is directed to the pressure reducing device 211 as a capillary tube, where the refrigerant is transformed to a mist. The low pressure mist state refrigerant from the pressure reducing device 211 is introduced into the inner upstream heat exchanger 109, where the refrigerant absorbs heat from the air in the duct 107, and causes the refrigerant to evaporate, and is returned to the accumulator 215 and the inlet 201-1 of the compressor 201. Namely, at the upstream inner heat exchanger 109, the air in the duct is cooled and dehumidified, and is directed to the downstream heat exchanger 110 where the air is heated to a desired temperature.

Figure 5:
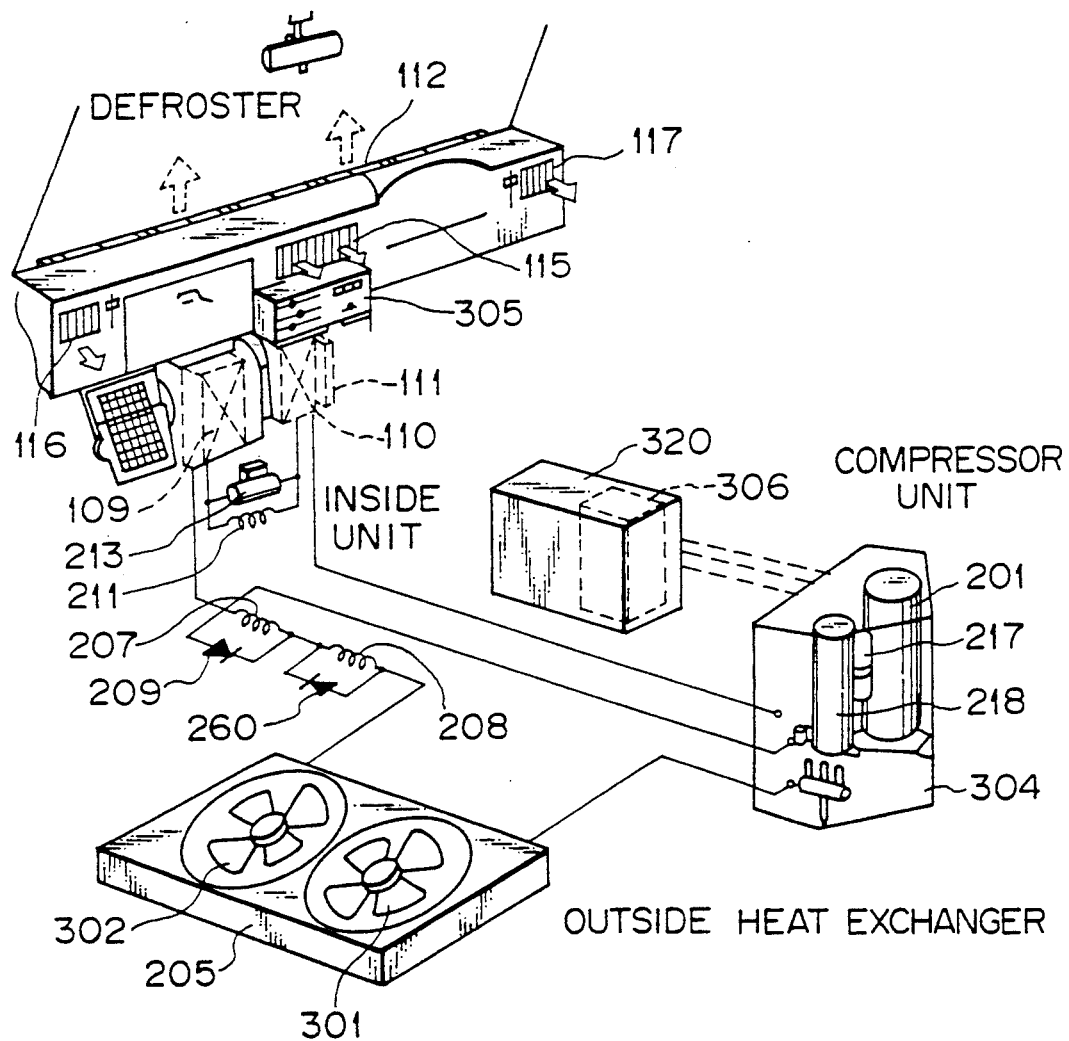
FIG. 5 is a schematic perspective view of the air conditioning apparatus according to the present invention, illustrating how main parts thereof are arranged in the automobile.

FIG. 5 shows how the air conditioning apparatus as explained above with reference to FIGS. 1 to 4 is arranged in the cabin of the automobile. It should be noted that unlike the usual air conditioning apparatus for an automobile where the compressor is operated by an internal combustion engine, the compressor 201 for an air conditioning apparatus of the present invention is operated by an electric motor. Thus, the compressor 201 has a large degree of freedom as far as its location in the car is concerned. The electric motor for operating the compressor may be a brushless AC or DC motor. It should be noted that the inverter in this specification means not only the DC-AC transformer for controlling the rotational speed of the AC motor as explained above with reference to FIG. 3 but also an electric controller for controlling the rotational speed of the DC motor. According to the present invention, the compressor 201 is arranged at a location of the vehicle from its middle portion to its rear portion. Furthermore, the outside heat exchanger 205 should be arranged at a location of the vehicle capable of introducing a desired amount of air at both the cooling and heating operations. An electrical control box 320 in the embodiment in FIG. 5 stores the inverter 306 as well as the control unit 307.

As explained above, according to the air conditioning apparatus of the present invention, the heat exchanger operates as an evaporator (evaporator) is both of the inner heat exchangers 109 and 110 during the cooling operation, and the inner heat exchanger 109 in the dehumidifying mode. In the cooling mode or the dehumidifying mode, the moisture content in the air is high due to the fact that the temperature of the surface of the heat exchanger(s) is reduced, thereby causing drops of water to attach to the surface thereof. During switching from the cooling or dehumidifying operation to the heating operation, the heat exchangers 109 and 110 or the heat exchanger 109 operated previously as an evaporator change to a condenser (heater). As a result, the drops of water produced during the preceding cooling operation or dehumidifying operation is now heated and evaporated, and which, together with the air in the duct 107, is discharged into the cabin. It is usual for the cooling or dehumidifying operation to be effected in the inner air introduction mode, i.e., the switching door 104 is moved to the position 104B for opening the inlet 102 and introducing the inner air from the cabinet to the duct 107. Thus, switching to the heating operation from the cooling operation or dehumidifying operation while maintaining the inner air introduction mode may increase the humidity in the cabin, thereby causing condensation to form on the windows. Such a rapid clouding of the windows may, when the switching is effected when the vehicle is moving, reduce the drivers field of vision. Furthermore, it may also be usual that,
mode, the upper outlet
is selected where the air flows are discharged from the upper (vent) outlets 115-1, 116-1 and 117-1, i.e., the air flow from these outlets 115-1, 116-1 and 117-1 is directed toward the upper part of the driver or passenger adjacent to the windows, thereby promoting the occurrence of condensation on the windows when switching from the cooling operation or dehumidifying operation to the heating operation.

According to the present invention, in order to obviate the above mentioned problem, a means is provided for activating an alarm when condensation on the windows is likely to occur, i.e., the air inlet is in the outside air inlet mode when the switching to the heating operation, so that the driver is reminded to change the air inlet mode to the outside air introduction position and to change the air discharge mode to the lower mode.

Figure 6:
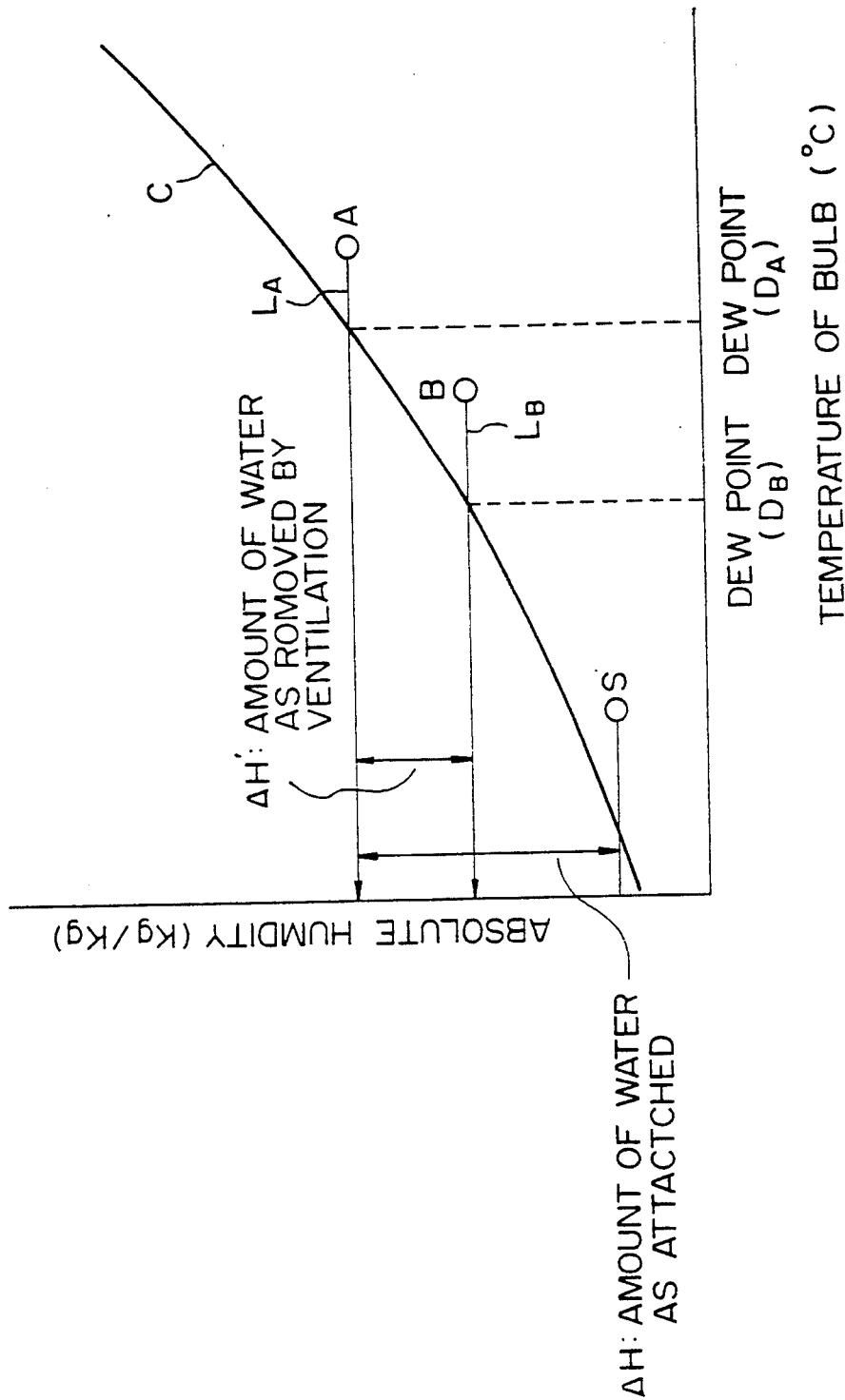
FIG. 6 shows a relationship between the temperature measured by a dry bulb and the absolute humidity in the cabin of the automobile.

In FIG. 6, at a location of a cabin, during a heating operation, abscissa shows a temperature of the air measured by a dry bulb and the ordinate shows absolute humidity. A line C shows dew points at respective temperatures. A location S corresponds to humidity when switching from the cooling operation or dehumidifying operation to the heating operation. A location A in FIG. 6 corresponds to the humidity of the air in the cabin when the inner air introduction mode is maintained after switching to the heating operation. A difference $\Delta H$ in the humidity obtained at the location A from that at the location S corresponds to an increases in humidity due to the fact that the heating operation is effected while the inner air introduction mode is maintained, i.e., the damper 104 maintains the position 104B so as to open the inside air inlet 102. A dew point at the location A is obtained as an intersection of the level $L_A$ with the curve C, which is $D_A$ in FIG. 6. Due to a higher value $D_A$ of the dew point at the location A, the windows are easily clouded even when the outside atmospheric air temperature is not low.

In FIG. 6, the location B corresponds to the humidity when a switching to the outside air introduction mode is effected at the same time as a switching to the heating operation. In this case, the damper 104 is moved to the position 104A so as to open the outside air inlet 103, and low temperature outside air is introduced into the cabin, on one hand, and air having a relatively high temperature and high humidity is removed from the atmosphere, on the other hand. As a result, the humidity value in the cabin is reduced, and the temperature in the cabin is more or less reduced. A dew point at the location B is obtained as an intersection of the level $L_B$ with the curve C, which is $D_B$ in FIG. 6, which is highly reduced from the dew point $D_A$ in the location A, thereby making it unlikely that condensation will form on the windows. In FIG. 6, $\Delta H'$ shows a reduction in the humidity in the cabin obtained by the forced outside air introduction when switching to the heating operation from the cooling or dehumidifying operation, according to the present invention.

According to the present invention, the outlet mode is, when switching to the outside air introduction mode, preferably switched to the lower outlet mode so that the air flow is directed to the lower part of the passengers, which is further effective in reducing the occurrence of condensation forming on the windows.

A desired duration of the time of the outside air introduction mode after switching to the heating operation will now be discussed. The water droplets attached to the surface of the inner heat exchanger 109 and/or 110 during the preceding cooling or dehumidifying process can fully evaporate within 10 to 20 minutes after switching to the heating operation, although it is dependent on the total amount of water droplets. However, switching to the inside air inlet mode from the outside air inlet mode may cause the windows to cloud, since the evaporated water cannot be fully ventilated and discharged to the atmosphere, which does not reduce the humidity lower than the location A (FIG. 6) having a higher temperature and humidity. Furthermore, moisture issuing from the passengers due to respiration quickly increases the humidity to the original location A.

In order to obviate this problem, according to the present invention, the forced ventilation using the outside air inlet mode after switching to the heating operation is carried out and the humidity is lowered from the level A to the level S. The duration thereof depends on the circumstances, but the inventor's has found that three hours has a sufficient margin under any circumstances.

Furthermore, when frost or dew does not form on the surface of the inner heat exchanger(s), a temporary outside air inlet mode when switching to the heating operation from a cooling or dehumidifying operation is not necessary. Thus, according to the invention, a request to switch to the outside air inlet mode when switching to the heating operation is only effected when the heating operation is started within eight hours after the preceding cooling or dehumidifying operation has continued for a period of longer than 1 minute. The cooling or dehumidifying operation 1 minute lower limit is because a cooling or dehumidifying operation shorter than 1 minute does not generate frost or dew on the heat exchanging surface of the heat exchanger.

The request to switch to the outside air introduction mode is issued only when the heating operation is started within eight hours after the preceding cooling or dehumidifying operation because most of the water droplets attached to the surface of the heat exchanger are usually completely drained outside the vehicle after 8 hours, and the remaining water evaporates and is discharged outside of the vehicle. The evaporated water will not cause the window to cloud because the amount of water is small and the water evaporates slowly so that the evaporated water does not increase the humidity in the cabin, and is naturally replaced by outside air and is discharged into the atmosphere.

According to the present invention, even when the heating operation is interrupted, and started again, the interval for maintaining the outside air inlet mode is started from the beginning of the first heating cycle, and when the heating operation is initially effected for a period of, for example, three hours, the major amount of water is evaporated during the initial heating cycle, and only a small amount of water is left in the heat exchanger. Thus, a limited amount of time in the outside air introduction mode during the subsequent heating cycle is sufficient to remove the water content from the heat exchanger.

FIGS. 7(A) and 7(B) show a flowchart illustrating the above mentioned operation for forcing the driver to switch to the outside air introduction mode during a heating operation. At step 8, it is determined whether a heating operation is in progress, and when affirmative, the routine goes to step 10, where it is determined whether eight hours have passed since the cooling or dehumidifying operation has been executed. The duration of time is counted by the timer 307a, and when it is determined that eight hours have passed since the last cooling or dehumidifying operation, the routine proceeds to step 12, where a heating operation is carried out, where the control unit 307 controls the rotational speed of the compressor 201 in accordance with the position of the temperature control lever 332, and controls the amount of air discharged in accordance with the position of the air amount control lever 334.

When it is, at step 10, determined that eight hours have not passed since the last cooling or dehumidifying operation, the routine goes to step 20, where it is determined whether the cooling or dehumidifying operation has lasted for a period of longer than one minute, and when it is determined that the preceding cooling or dehumidifying operation has not continued for a period of longer than 1 minute, the routine goes to step 12 to execute the heating operation. When it is, at step 20, determined that the preceding cooling or dehumidifying operation has continued for a period of longer than 1 minute, the routine goes to step 30, where it is determined that this heating operation is the first one that has been executed following the end of the preceding cooling or dehumidifying operation. When it is determined that this heating operation is the first one executed after finishing the preceding cooling or dehumidifying operation, the routine goes to step 40, where the timer 307b for counting the duration of the heating operation is started, and to step 50. When it is determined that this heating operation is not the first one executed following the completion of the preceding cooling or dehumidify operation, the routine goes directly to step 50. At step 50, it is determined whether three hours has passed since the commencement of the heating operation, and when it is determined that three hours has passed since the beginning of the heating operation, the routine goes to step 12 to execute a normal heating operation. When it is determined that three hours has not passed since the beginning of this heating operation, the routine goes to step 60, where it is determined if the outer air introduction mode has been assumed, i.e., the damper 104 in FIG. 1 has already moved to the position 104A for introduction of the outside air. When it is determined that the outer air introduction mode has not been assumed, the routine goes to step 70, where the operating lamp 335a and the outside air introduction indicator lamp 333b on the control panel 305 are turned ON and OFF to instruct the driver or passenger to switch to the outside air introduction mode, and subsequently goes to step 80. When it is determined that the outer air introduction mode has been assumed, the routine proceeds directly to step 80, where it is determined whether the lower outlet mode has been assumed, i.e., the mode selection lever 331 is moved to the lower outlet mode position (331c) in FIG. 4, and when it is determined that the lower outlet mode has been assumed, the routine goes to step 12 to execute the heating operation. When it is determined that the lower outlet mode has not been assumed, the routine goes to step 90, the indicator lamp 331c on the panel 305 is turned ON and OFF to instruct the driver to switch the outlet mode selecting lever 331 to the lower outlet mode position (331c).

The timer at step 40 is reset when the first heating operation is started within 8 hours from the end of the preceding cooling or dehumidifying operation. Namely, switching OFF the air conditioning unit ensures the continued operation of the timer 307b. In other words, at step 50, the forcible outside air introduction mode is stopped three hours after the initial commencement of the heating operation following a cooling or dehumidifying operation.

In the first embodiment, the indicator lamps are turned ON and OFF to remind the driver to change to the outside air inlet mode. In place of the provision of indicator lamps, a warning alarm may be activated to remind the driver to change to the outside air inlet mode.

According to the first embodiment described with reference to FIGS. 1 to 8, the driver is notified of the switching to the outside air introduction mode so as to remind him to switch to the outside air introduction mode. However, it is possible to have a construction such that the control unit 307 issues signals to respective actuators so that the switching to the outside air introduction mode and switching to the lower outlet mode of the air discharged to the cabin are obtained automatically. Such an embodiment for obtaining the automatic switching of the air introduction mode as well as the air discharge mode will be explained in more detail with reference to FIGS. 8 to 10. FIG. 8 shows a construction of a control circuit in the second embodiment, which is the same as FIG. 3 in the first embodiment except that a provision is made for a servo-motor 408 connected to the damper 104 for moving between the position 104A and introducing the outside air via the inlet 103 and the position 104B for introducing the inside air via the inlet 102, and a servo-motor 409 connected to the dampers 118 to 122 for moving between the upper outlet position where the air flows are discharged from the upper outlets 115-1, 116-1 and 117-1, the bi-level position where the air flows are discharged from both of the upper outlets 115-1, 116-1 and 117-1 and the lower outlets 113-1, the lower outlet position where the air flows are discharged from the lower outlets 113-1, the lower outlet/defroster position where the air flows are discharged from the lower outlets 113-1 and the defroster outlet 112-1, and the defroster position where the air flows are discharged from the defroster outlet 112-1.

FIG. 9 shows a control panel in the second embodiment. The control panel 505 is provided with a mode selection section 531 for selecting a desired mode, an air amount control switch 532 for obtaining a desired amount of air flow into the cabin, an inlet selection switch 533 for selecting an air inlet between the inside air mode and the outside air mode, a mode selection section 535 for selecting a desired mode, and a temperature control lever 534 for controlling the rotational speed of the compressor 201 at the respective modes as selected. The outlet control section 531 includes a high level mode button 531a for obtaining an air flow from the upper (ventilation) outlets 115-1, 116-1 and 117-1, a bi-level mode button 531b for obtaining an air flow from the both of the upper and lower outlets 115-1, 116-1 and 117-1, and 113-1, a lower level mode button 531c for obtaining an air flow from the lower level outlets 113-1, a DEF/VENT mode button 531d for obtaining an air flow from the defroster outlet 112-1 and the lower level outlet 113-1, and a defroster mode button 531e for obtaining an air flow from the defroster outlet 112-1. The air amount control switch 532 is for switching the amount of air in the duct 107 between a high (H), medium (M) and low (L) amounts. The selection switch 533 is for selecting between a condition where the outside air is introduced, a condition where the inside air is recirculated, and a condition where both the outside air introduction and the inside air recirculation takes place. The mode select section 535 is constructed by a function 535-1 for stopping the operation, a function 535-2 for controlling the operation of the fan 104, a function 535-3 for obtaining a cooling operation, a function 535-4 for obtaining a heating operation, and a function 535-5 for obtaining a dehumidifying (DRY) operation. The control panel 505 is further provided with a de-icing switch 540 for de-icing the outside heat exchanger 205 during the heating mode, and an auto switch 542 for automatically selecting between a heating and cooling operation for obtaining a set temperature. Namely, the rotational speed of the compressor 201 is controlled so as to obtain the set temperature.

FIG. 10 shows a flowchart of a heating operation in the second embodiment. At step 600, it is determined whether a heating operation is in progress as a result of the heating switch 535-4 being ON or a heating mode during an auto mode operation entered by the ON position of the auto switch 542, and when it is determined that a heating operation is in progress, the routine goes to step 602, where it is determined whether it is within eight hours from the end of the latest cooling or dehumidifying operation, and to step 604, where it is determined whether the preceding cooling or dehumidifying operation has continued for a period of longer than one minute. These steps 602 and 604 are the same as steps 20 and 30, respectively, in FIG. 7(A). When it is determined that it is within eight hours from the end of the last cooling or dehumidifying operation lasting for a period of longer than one minute, the routine goes to step 606, where it is determined whether the temperature $T_A$ of the refrigerant discharged from the outlet 201-2 of the compressor 201 is larger than a predetermined value $T_{AO}$. When it is determined that the refrigerant outlet temperature $T_A$ is smaller than the predetermined value $T_{AO}$, the routine goes to step 608, where a heating operation is effected while the fan 105 is stopped by de-energizing the fan motor 106. As a result, a discharge of low temperature air flows to the cabin is prevented.

When it is determined that the refrigerant temperature $T_A$ is higher than the predetermined value $T_{AO}$, the routine goes to step 610, where a heating operation under the forcible outside air introduction and the lower outlet mode is obtained. Namely, the servo motor 408 moves the damper 104 in FIG. 1 to the position 104A for introducing the outside air into the duct 107, and the servo motor 409 moves the dampers 118 to 122 to positions to obtain the lower outlet mode, where the flows of air are discharged from the lower outlets 113-1 to the cabin. Namely, the damper 119 opens the duct 113 to allow the flows of air to the lower outlets 113-1, while dampers 118 close the duct 112 to prevent a flow from the defroster outlet 112-1 and the dampers 120 to 122 close the corresponding ducts to prevent the flows from the upper outlets 115-1, 116-1 and 117-1. In this case, the rotational speed of the compressor 201 is controlled in accordance with the setting of the temperature control lever 534, while the amount of air passing the duct 107 is controlled by the setting of the air amount control switch 532.

At step 612, it is determined whether a predetermined time of, for example, 10 to 20 minutes has elapsed from the beginning of the commencement of the forcible outside air introduction in the lower outlet mode at step 610. Such a forced outside air introduction in the lower outlet mode for a period of 10 to 20 minutes can prevent evaporated water from producing a sharp increase in humidity in the cabin, thereby preventing the windows from clouding.

When it is, at step 612, determined that the predetermined time has elapsed, the routine goes to step 614 where the usual heating operation is carried out.

Namely, the forcible outlet air introduction with a lower outlet position is canceled.

In the second embodiment, in place of comparing the refrigerant temperature with the predetermined value, at step 606, the pressure of the refrigerant is compared with a predetermined value, such as 8 kg/cm$^2$ in case of R134A as a refrigerant, since the value of the pressure of the refrigerant corresponds to the temperature of the refrigerant.

In the first and second embodiments, both the outside air introduction mode and the lower outlet mode are requested upon commencement of the heating operation after the cooling or dehumidifying operation. However, it may be possible to have a construction so that only the outside air introduction mode is requested upon the commencement of the heating operation after the cooling or dehumidifying operation.

In the above embodiments, the idea of the present invention is applied to the air conditioning system provided with a refrigerating cycle wherein the direction of the flow of the refrigerant is switched between a first direction for obtaining a cooling operation and a second direction for obtaining a heating operation. However, the present invention can be applied to an air conditioning apparatus wherein a heated medium or cooled medium is selectively introduced into an inner heat exchanger. Namely, as shown in FIG. 11, a single inner heat exchanger 700 is arranged in a duct for an air flow directed to the cabin, as the duct 107 in the first embodiment in FIG. 1. A circuit 702 for a cooling medium (brine) is provided, on which the inner heat exchanger 700 is arranged for obtaining a heat exchange between the air conditioning medium and the air to be air conditioned. The circuit 702 includes two branched sections 702-1 and 702-2. Also arranged in the circuit 702 is a brine pump 704 for obtaining a recirculation of the medium in the circuit 702, and a three port two position switching valve 706 for switching between a position where a flow of the medium occurs in the first section 702-1 and a position where a flow of the medium occurs in the second section 702-2. A burner 707 is arranged adjacent to the first section 702-1 for obtaining a heating of the medium flowing along the section 702-1. A refrigerating circuit 708 is provided on which a compressor 710, an outside heat exchanger 712, a pressure reducing device (capillary tube) 714 and an accumulator 718 are arranged. A heat exchanger (cooler) 720 is arranged for obtaining a heat exchange of the refrigerant in the circuit 708 with the heat exchanging medium in the second section 702-2 of the circuit 702. During a heating operation, the burner 707 is operated so that the heat exchanging medium is heated by the burner 707, and the switching valve 706 is moved to a position where the flow of the medium passing the first section 702-1 occurs as shown by the solid line. As a result, a heat exchange between the heated heat exchanging medium and the air occurs at the inner heat exchanger 700 for heating the air contacting the heat exchanger 700 and discharged to the cabin. During a cooling operation, the compressor 710 is operated so that the refrigerating medium is evaporated at the cooler 720, and the switching valve 706 is moved to a position where the flow of the medium passing the second section 702-2 occurs as shown by the dotted line. As a result, a heat exchange occurs between the refrigerant having a low temperature and the air conditioning medium at the cooler 720, and a heat exchange between the cooled heat exchanging medium and the air in the duct occurs at the inner heat exchanger 700 for cooling the air contacting the heat exchanger 700 and discharged to the cabin.

As for the embodiment in FIG. 11, a provision is made for reminding the driver to change to the outside air inlet mode upon switching to the heating operation, similar to the first embodiment (FIGS. 7(A) and 7(B)), or a provision is made for forced switching to the outside air inlet mode upon switching to the heating operation, similar to the second embodiment (FIG. 10).

While embodiments of the pres invention are described with reference to drawings, many modifications and changes can be ma by those skilled in this art without departing from the scope and sprit of the invention.

We claim:

1. An air conditioning apparatus for an automobile having a cabin, comprising:
   a duct having a first end for intaking air and a second end for discharging the air flow to the cabin;
   an air inlet switching means for switching between an outside air inlet mode where an air outside the cabin is introduced into the duct and an inside air inlet mode where the air inside the cabin is introduced into the duct;
   fan means for generating a forcible flow of air introduced into the duct via said inlet;
   heat exchanging means for receiving a flow of a heat exchanging medium for obtaining a heat exchange between the medium and said air flow in the duct;
   heat source switching means for switching between a low temperature source mode where a source of the low temperature medium is connected to the heat exchanging means, and a hot temperature source mode where a source of the high temperature medium is connected to the heat exchanging means, and;
   means for forcing said air inlet switching means to obtain said outside air inlet mode upon switching to the hot temperature source mode after the execution of the low temperature source mode.

2. An air conditioning apparatus according to claim 1, wherein said duct having, at said second end, an upper outlet for discharging the air flow into the cabin at a higher level, and a lower outlet for discharging the air flow into the cabin at a lower level, and wherein it further comprises air outlet switching means for switching between a upper mode where the air flow is discharged from the upper outlet and a lower mode where the air flow is discharged from the lower outlet, and means for forcing said air outlet switching means to obtain said lower air outlet mode when a switching to the hot temperature source mode after the execution of the low temperature source mode.

3. An air conditioning apparatus according to claim 1, further comprising timer means for setting the time wherein said air inlet switching means is forced to obtain the outside air inlet mode by said forcing means.

4. An air conditioning apparatus according to claim 1, further comprising timer means for measuring the time following the end of the low temperature source mode, and means for preventing the operation of said forcing means for obtaining the forced outside air inlet mode when the measured time is longer than a predetermined value.

5. An air conditioning apparatus according to claim 1, further comprising timer means for measuring the time after the commencement of the heating operation following the preceding low temperature source mode, and means for stopping the operation of said forcing means for obtaining the forced outside air inlet mode when the measured time is longer than a predetermined value.

6. An air conditioning apparatus according to claim 1, further comprising timer means for measuring the duration time of the preceding low temperature source mode, and means for cancelling the operation of said forcing means for obtaining the forced outside air inlet mode when the measured time is shorter than a predetermined value.

7. An air conditioning apparatus for an automobile having a cabin, comprising:
a duct having an inlet for an intake of air and an outlet for the discharge of an air flow to the cabin;
an air inlet switching means for switching between an outside air inlet mode where an air outside the cabin is introduced into the duct and an inside air inlet mode where the air inside the cabin is introduced into the duct;
a fan means for generating a forcible flow of the air as introduced into the duct via said inlet;
a refrigerating cycle including a circuit for a refrigerant, a compressor, a first heat exchanger, a second heat exchanger and a pressure reducer, said first heat exchanger being arranged in the duct for obtaining a heat exchange between the refrigerating medium and the air in the duct, the second exchanger being arranged for obtaining a heat exchange between the refrigerating medium and the air outside the duct;
heat source switching means for switching the direction of the flow of the refrigerant in said circuit between a heating mode where the refrigerant from the compressor is, first, directed to the first heat exchanger, and to the pressure reducer and the second heat exchanger, thereby causing the first heat exchanger to operate as a condenser to heat the air in the duct, and a cooling mode where the refrigerant from the compressor is, first, directed to the second heat exchanger, and then to the pressure reducer and the first heat exchanger, thereby causing the first heat exchanger to operate as an evaporator to cool the air in the duct, and;
means for forcing said air inlet switching means to obtain said outside air inlet mode when switching to the heating mode after the execution of a cooling or dehumidifying operation in the cooling mode.

8. An air conditioning apparatus according to claim 7, wherein it further comprises a third heat exchanger that is arranged in the duct at a position upstream from the first heat exchanger for obtaining a heat exchange between the refrigerant and the air in the duct; said heat source switching means further having a dehumidifying mode where the refrigerant from the compressor is, first, introduced into the first heat exchanger, and to the pressure reducer and to the third heat exchanger; the first heat exchanger heating the air in the duct, the third heat exchanger cooling the air in the duct, and said forcing means further forcing said air inlet switching means to obtain said outside air inlet mode when switching to the heating mode after the execution of a dehumidifying operation.

9. An air conditioning apparatus for an automobile having a cabin, comprising:
a duct having a first end for the intake of air and a second end for the discharge of an air flow to the cabin;
an air inlet switching means for switching between an outside air inlet mode where air outside the cabin is introduced into the duct and an inside air inlet mode where the air inside the cabin is introduced into the duct;
a fan means for generating a forcible flow of the air as introduced into the duct via said inlet;
heat exchanging means for receiving a flow of a heat exchanging medium for obtaining a heat exchange between the medium and said air flow in the duct;
heat source switching means for switching between a low temperature source mode, where a source of the medium having a low temperature is connected to the heat exchanging means, and a hot temperature source mode, where a source of the medium having a high temperature is connected to the heat exchanging means, and;
means for notifying a request thereby causing inlet switching means to obtain said outside air inlet mode when switching to the hot temperature source mode following the execution of a cooling or dehumidifying operation in the low temperature source mode.

10. An air conditioning apparatus according to claim 9, wherein said notifying means comprise means for detection of a switching to the heating operation, and means for indicating the request of the switching to the outside air intake mode upon the detection of the switching to the heating operation from the cooling or dehumidifying operation.

11. An air conditioning apparatus according to claim 10, wherein said indicating means comprises an indicator lamp, and means for turning the lamp ON and OFF upon detection of a switching to the heating operation when the inlet switching means is in its inside air inlet mode.

12. An air conditioning apparatus according to claim 9, wherein said duct having, at the said second end, an upper outlet for discharging the air flow into the cabin at a higher level, and a lower outlet for discharging the air flow into the cabin at a lower level, and wherein it further comprises air outlet switching means for switching between a upper mode where the air flow is discharged from the upper outlet and a lower mode where the air flow is discharged from the lower outlet, and second means for notifying a request thereby causing said outlet switching means to assume said lower air outlet mode when switching to the hot temperature source mode following the execution of a cooling or dehumidifying operation in the low temperature source mode.

13. An air conditioning apparatus according to claim 12, wherein said second notifying means comprise means for the detection of a switching to the heating operation, and means for indicating the request of the switching to the lower outlet mode upon detection of a switching to the heating operation from the cooling or dehumidifying operation when the air outlet switching means is in its upper outlet mode.

14. An air conditioning apparatus according to claim 13, wherein said indicating means comprises an indicator lamp, and means for turning the lamp ON and OFF upon detection of a switching to the heating operation.

15. An air conditioning apparatus for an automobile having a cabin, comprising:
a duct having an inlet for an intake of air and an outlet for the discharge of an air flow to the cabin;

an air inlet switching means for switching between an outside air inlet mode, where air outside the cabin is introduced into the duct, and an inside air inlet mode, where the air inside the cabin is introduced into the duct;

a fan means for generating a forcible flow of the air as introduced into the duct via said inlet;

a refrigerating cycle including a circuit passageway for a refrigerant, a compressor, a first heat exchanger, a second heat exchanger and a pressure reducer; said first heat exchanger being arranged in the duct for obtaining a heat exchange between the refrigerating medium and the air in the duct; the second heat exchanger being arranged for obtaining a heat exchange between the refrigerating medium and the air outside the duct;

heat source switching means for switching the direction of the flow of the refrigerant in said circuit between a heating mode, where the refrigerant from the compressor is first directed to the first heat exchanger, the pressure reducer and the second heat exchanger, thereby causing the first heat exchanger to operate as a condenser and heat the air in the duct, and a cooling mode where the refrigerant from the compressor is first directed to the second heat exchanger, and then to the pressure reducer and the first heat exchanger, thereby causing the second heat exchanger to operate as an evaporator and cool the air in the duct, and;

means for issuing an electric signal to the inlet switching means for switching said air inlet switching means to the outside air inlet mode when switching to the hot temperature source mode following the execution of a cooling or dehumidifying operation in the low temperature source mode.

16. An air conditioning apparatus according to claim 15, further comprising means for the detection of the pressure of the refrigerant issued from the compressor, and means for allowing a switching to the outside air intake mode when the pressure of the refrigerant detected by the sensor is larger than a predetermined value.

17. An air conditioning apparatus according to claim 15, wherein said duct having, at said second end, an upper outlet for discharging the air flow into the cabin at a higher level, and a lower outlet for discharging the air flow into the cabin at a lower level, and wherein it further comprises air outlet switching means for switching between a upper mode, where the air flow is discharged from the upper outlet, and a lower mode, where the air flow is discharged from the lower outlet, and means for issuing an electric signal to the outlet switching means for switching to the lower outlet mode when switching to the hot temperature source mode following the execution of a cooling or dehumidifying operation in the low temperature source mode when the air outlet switching means is in its upper outlet mode.

* * * * *